(12) United States Patent
Lota

(10) Patent No.: US 10,279,703 B2
(45) Date of Patent: May 7, 2019

(54) VEHICLE SEAT ADJUSTMENT SYSTEMS

(71) Applicant: Toyota Motor Engineering & Manufacturing North America, Inc., Erlanger, KY (US)

(72) Inventor: Charan S. Lota, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 161 days.

(21) Appl. No.: 15/422,783

(22) Filed: Feb. 2, 2017

(65) Prior Publication Data

US 2018/0154799 A1 Jun. 7, 2018

Related U.S. Application Data

(60) Provisional application No. 62/429,262, filed on Dec. 2, 2016.

(51) Int. Cl.
| | | |
|---|---|---|
| *B60N 2/02* | (2006.01) | |
| *B60N 2/06* | (2006.01) | |
| *B60N 2/22* | (2006.01) | |
| *B60R 1/00* | (2006.01) | |
| *B60K 35/00* | (2006.01) | |

(52) U.S. Cl.
CPC ............ *B60N 2/0224* (2013.01); *B60K 35/00* (2013.01); *B60N 2/0232* (2013.01); *B60N 2/06* (2013.01); *B60N 2/22* (2013.01); *B60R 1/00* (2013.01); *B60K 2350/106* (2013.01); *B60K 2350/1028* (2013.01); *B60K 2350/2013* (2013.01); *B60K 2350/2017* (2013.01); *B60R 2300/8006* (2013.01)

(58) Field of Classification Search
None
See application file for complete search history.

(56) References Cited

U.S. PATENT DOCUMENTS

| 4,669,780 A * | 6/1987 | Sakakibara | .......... B60N 2/0232 |
|---|---|---|---|
| | | | 297/257 |
| 4,852,934 A * | 8/1989 | Yasuda | ................ B60N 2/0232 |
| | | | 296/64 |

(Continued)

FOREIGN PATENT DOCUMENTS

| DE | 4001101 B1 | 7/1991 |
|---|---|---|
| EP | 2062815 B1 | 3/2010 |
| EP | 1870334 A1 | 8/2015 |

*Primary Examiner* — Rami Khatib
(74) *Attorney, Agent, or Firm* — Dinsmore & Shohl LLP

(57) ABSTRACT

Vehicle seat adjustment systems that move more than one seat in a linked manner are disclosed. A vehicle seat adjustment system for a vehicle includes a front seat of the vehicle, one or more passenger seats behind the front seat, an input device configured to receive an input for adjusting positions of the front seat, a first actuator configured to adjust positions of the front seat, a second actuator configured to adjust positions of the one or more passenger seats, and a controller communicatively coupled to the input device and the first and second actuators. The controller instructs the first actuator to move the front seat in a longitudinal direction for a first distance in response to the received input, and instructs the second actuator to move the one or more passenger seats in the longitudinal direction for a second distance in response to the received input.

16 Claims, 6 Drawing Sheets

(56) References Cited

U.S. PATENT DOCUMENTS

| | | |
|---|---|---|
| 7,023,108 B2 | 4/2006 | Itami et al. |
| 8,260,506 B2 | 9/2012 | Jungert et al. |
| 9,211,821 B2 | 12/2015 | Kreder |
| 9,333,880 B2 | 5/2016 | Farquhar et al. |
| 2004/0036330 A1* | 2/2004 | Itami .................... B60N 2/0248 297/243 |
| 2005/0061914 A1* | 3/2005 | Bishop ............... B60N 2/01575 244/118.5 |
| 2008/0007101 A1* | 1/2008 | Abt ...................... B60N 2/0244 297/240 |
| 2008/0009958 A1* | 1/2008 | Abt ...................... B60N 2/0244 700/29 |
| 2009/0212933 A1* | 8/2009 | Salazar .................. B60N 2/002 340/457 |
| 2011/0017869 A1* | 1/2011 | Gonnsen ................ B64D 11/00 244/118.6 |
| 2011/0031772 A1* | 2/2011 | Mabuchi .................. B60N 2/01 296/64 |
| 2017/0064067 A1* | 3/2017 | Hockenberry .... H04M 1/72533 |
| 2017/0072816 A1* | 3/2017 | Lippman ............... B60N 2/0244 |
| 2017/0166089 A1* | 6/2017 | Frye ....................... B60N 2/002 |

\* cited by examiner

VEHICLE SEAT ADJUSTMENT SYSTEMS

CROSS-REFERENCE TO RELATED APPLICATIONS

This application claims priority to U.S. Provisional Patent Application No. 62/429,262 filed on Dec. 2, 2016, the entire contents of which are hereby incorporated by reference.

TECHNICAL FIELD

The present specification generally relates to vehicle seat adjustment systems and, more specifically, to vehicle seat adjustment systems that adjust positions of a front seat and one or more seats located behind the front seat in a linked manner.

BACKGROUND

Positions of a driver seat and passenger seats in a vehicle can be individually adjusted, e.g., in a rearward direction or a forward direction. In a conventional seat adjustment system, a driver sitting in a driver seat may adjust the position of the seat either automatically (e.g., using an electric motor) or manually. However, in the conventional seat adjustment system, when the driver moves the driver seat, the space between the driver seat and a rear seat behind the driver seat may change because the rear seat may remain stationary. A passenger present in the rear seat may become uncomfortable between the seats when the driver seat is moved toward the rear seat thereby shrinking leg room for the passenger. Further, objects between the driver seat and the rear seat may become difficult to access due to the reduced distance between the driver seat and the rear seat. In order to maintain sufficient space between the driver seat and the rear seat, the driver or passenger may need to separately move the rear seat as well.

Accordingly, a need exists for vehicle seat adjustment systems that move seats in a vehicle together while maintaining a space between the seats.

SUMMARY

In one embodiment, a vehicle seat adjustment system for a vehicle includes a front seat of the vehicle, one or more passenger seats behind the front seat, an input device configured to receive an input for adjusting positions of the front seat, a first actuator configured to adjust positions of the front seat, a second actuator configured to adjust positions of the one or more passenger seats, and a controller communicatively coupled to the input device and the first and second actuators. The controller instructs the first actuator to move the front seat in a longitudinal direction for a first distance in response to the received input, and instructs the second actuator to move the one or more passenger seats in the longitudinal direction for a second distance in response to the received input.

In another embodiment, a method of adjusting positions of a front seat and one or more passenger seats located behind the front seat in a vehicle includes receiving an input associated with the front seat, sending to a first actuator an instruction for moving the front seat in a first direction for a first distance in response to the received input, and sending to a second actuator an instruction for moving the one or more passenger seats in the first direction for a second distance in response to the received input.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 2A:
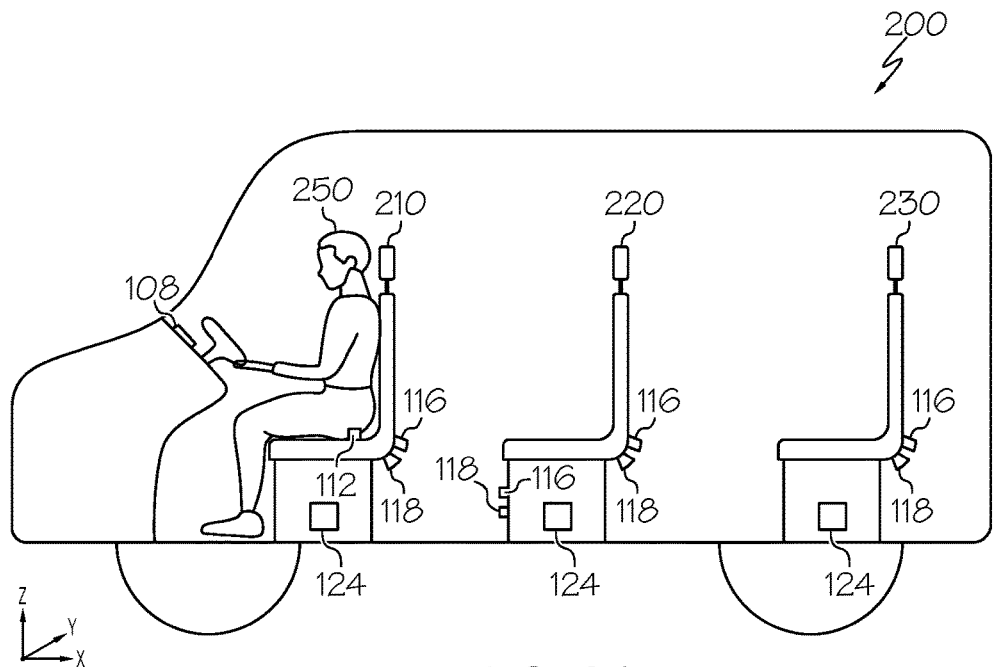
FIG. 2A schematically depicts a side view of a seat arrangement inside a vehicle according to one or more embodiments shown and described herein.

The embodiments disclosed herein include vehicle seat adjustment systems moving more than one seat in a linked manner. Referring generally to FIG. 2A, a vehicle seat adjustment system includes a front seat of a vehicle, one or more passenger seats behind the front seat, an input device configured to receive an input for adjusting positions of the front seat and the one or more passenger seats, a first actuator configured to adjust positions of the front seat, a second actuator configured to adjust positions of the one or more passenger seats, and a controller communicatively coupled to the input device and the first and second actuators. The controller instructs the first actuator to move the front seat in a longitudinal direction for a first distance in response to the received input, and instructs the second actuator to move the one or more passenger seats in the longitudinal direction for a second distance in response to the received input.

As used herein, the term "longitudinal direction" refers to the forward-rearward direction of the vehicle (i.e., in the +/−X-direction of the coordinate axes depicted in the figures). The term "lateral direction" refers to the cross-wise direction of the vehicle (i.e., in the +/−Y-direction of the coordinate axes depicted in the figures), and is transverse to the longitudinal direction. The term "vertical direction" refers to the upward-downward direction of the vehicle (i.e., in the +/−Z-direction of the coordinate axes depicted in the figures).

The term "seat arrangement," as used herein, refers to the relative orientation of some or all of the seats within the vehicle.

When a driver in the front seat adjusts the position of the front seat in a longitudinal direction, the space between the front seat and a rear seat behind the front seat may be changed. For example, if the front seat moves towards the rear seat while the rear seat maintains its position, the space between the front seat and the rear seat is reduced. The driver or passenger may need to adjust the position of the rear seat also in order to obtain a sufficient space between the seats or maintain the space between the seats. The embodiments described herein mitigate this inconvenience by providing vehicle seat adjustment systems and methods for moving the front seat and the rear seat of a vehicle in a linked manner to maintain space between the seats.

Figure 1:
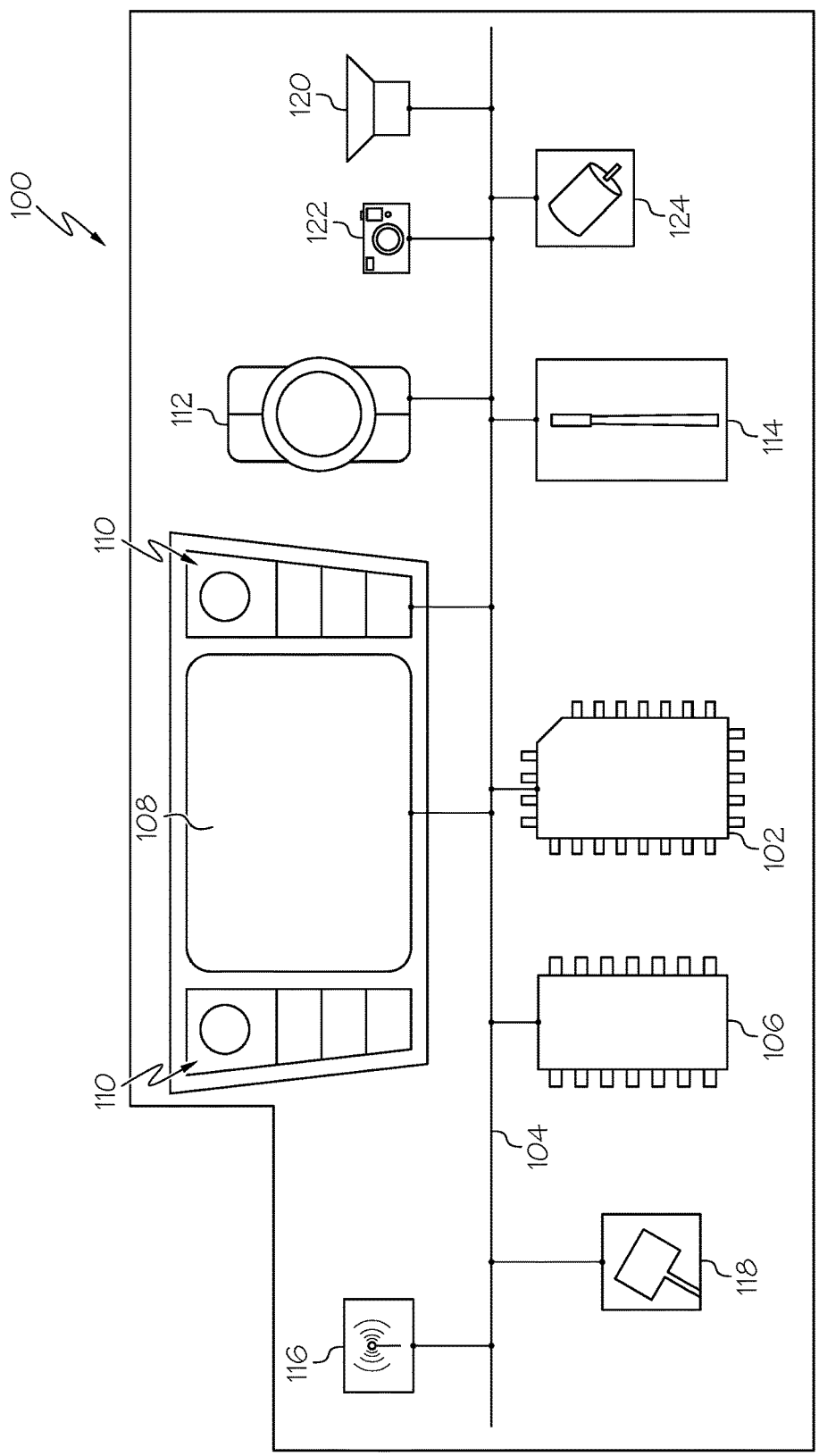
FIG. 1 schematically depicts a vehicle seat adjustment system according to one or more embodiments shown and described herein.

Referring now to FIG. 1, an embodiment of a vehicle seat adjustment system 100 is schematically depicted. It is noted that, while the vehicle seat adjustment system 100 is depicted in isolation, the vehicle seat adjustment system 100 may be included within a vehicle, for example, within the vehicle 200 of FIG. 2A. In embodiments in which the vehicle seat adjustment system 100 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the vehicle seat adjustment system 100 may be embodied within a mobile device (e.g., smartphone, laptop computer, etc.) carried by an occupant of the vehicle.

Still referring to FIG. 1, the vehicle seat adjustment system 100 includes one or more processors 102. Each of the one or more processors 102 may be any device capable of executing machine readable instructions. For example, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, it should be understood that the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. In embodiments, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle seat adjustment system 100 further includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The one or more memory modules 106 may be non-transient memory modules. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a database that includes information on seat arrangement settings. For example, the database may include default positions of the seats in a vehicle. The database may also include customized positions of the seats in a vehicle set by a user.

Referring still to FIG. 1, the vehicle seat adjustment system 100 comprises a screen 108 for providing visual output such as, for example, maps, navigation, entertainment, seat arrangements or a combination thereof. The screen 108 may be located on the head unit of the vehicle such that a driver of the vehicle may easily see the screen 108 while seated in the driver seat. For example, as shown in FIG. 2A, a driver 250 may see the screen 108 while being in the first row seat 210. The screen 108 may output one of map, navigation, entertainment, and seat arrangement data in response to a selection of a corresponding function. The screen 108 is coupled to the communication path 104. Accordingly, the communication path 104 communicatively couples the screen 108 to other modules of the vehicle seat adjustment system 100 including, without limitation, the one or more processors 102 and/or the one or more memory modules 106. The screen 108 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 108 may be a touch screen that, in addition to visually displaying information, detects the presence and location of a tactile input upon a surface of or adjacent to the screen 108. Accordingly, each display may receive mechanical (e.g., touch) input directly upon the optical output provided by the screen. For example, the screen 108 may receive an input from the driver 250 in FIG. 2A for moving the first row seat 210. Additionally, it is noted that the screen 108 can include at least one of the one or more processors 102 and at least one of the one or memory modules 106.

The depicted vehicle seat adjustment system 100 comprises tactile input hardware 110 coupled to the communication path 104 such that the communication path 104 communicatively couples the tactile input hardware 110 to other modules of the vehicle seat adjustment system 100. The tactile input hardware 110 may be any device capable of transforming mechanical, optical, or electrical signals into a data signal capable of being transmitted with the communication path 104. Specifically, the tactile input hardware 110 may include any number of movable objects that each transforms physical motion into a data signal that can be transmitted over the communication path 104 such as, for example, a button, a switch, a knob, a microphone or the like. In some embodiments, the screen 108 and the tactile input hardware 110 are combined as a single module and operate as an audio head unit or an infotainment system. However, it is noted, that the screen 108 and the tactile input hardware 110 may be separate from one another and operate as a single module by exchanging signals via the communication path 104. The tactile input hardware 110 may include a plurality of buttons or knobs for adjusting positions of one or more seats in a vehicle. In other embodiments, the vehicle seat adjustment system 100 may not include the tactile input hardware. Instead, the vehicle seat adjustment system 100 may include soft keys whose function changes depending on the context.

The vehicle seat adjustment system 100 may comprise a peripheral tactile input 112 coupled to the communication path 104 such that the communication path 104 communicatively couples the peripheral tactile input 112 to other modules of the vehicle seat adjustment system 100. In embodiments, the peripheral tactile input 112 may be located in a vehicle console to provide an additional location for receiving input. The peripheral tactile input 112 operates in a manner substantially similar to the tactile input hardware 110, i.e., the peripheral tactile input 112 includes movable objects and transforms motion of the movable objects into a data signal that may be transmitted over the communication path 104. In other embodiments, the peripheral tactile input 112 may be located at the side of a front-row seat, e.g., a driver seat such that a driver or passenger can manipulate while driving. For example, the driver presses or touches the peripheral tactile input 112 to adjust the position of a seat in the vehicle. Specifically, the peripheral tactile input 112 may be a knob, and if the driver rotates the knob clockwise, a seat behind her moves in one direction, and if the driver rotates the knob counterclockwise, the seat behind her moves in another direction. In another example, the peripheral tactile input 112 may include a plurality of buttons, such as directional arrows or button, similar to the tactile input hardware 110 such that the driver can adjust the positions of seats by manipulating the plurality of buttons.

In embodiments, the vehicle seat adjustment system 100 may optionally comprise a satellite antenna 114 coupled to the communication path 104 such that the communication path 104 communicatively couples the satellite antenna 114 to other modules of the vehicle seat adjustment system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106. In some embodiments, the vehicle seat adjustment system 100 does not include the satellite antenna 114.

Still referring to FIG. 1, the vehicle seat adjustment system 100 may further comprise a proximity sensor 116. The proximity sensor 116 is coupled to the communication path 104 such that the communication path 104 communicatively couples the proximity sensor 116 to other modules of the vehicle seat adjustment system 100. The proximity sensor 116 detects a distance between the proximity sensor 116 and an object nearby and communicates the proximity information to the one or more processors 102. The proximity sensor 116 may be any device capable of outputting a proximity signal indicative of a distance of an object to the proximity sensor. In some embodiments, the proximity sensor may include a laser scanner, a capacitive displacement sensor, a Doppler effect sensor, an eddy-current sensor, an ultrasonic sensor, a magnetic sensor, an optical sensor, a radar sensor, a sonar sensor, or the like. The proximity sensor 116 may be located at the back of a seat to detect an object behind the seat as shown in FIG. 2A. In another example, the proximity sensor 116 may be located on a seatback or a seating surface of a seat to detect if an object is in that seat. In yet another example, the proximity sensor 116 may be located at the side of the seat (+/−y direction). In some embodiments, the vehicle seat adjustment system 100 may be configured to determine the presence of an object on a seat of a vehicle based on an output signal output from the proximity sensor. In some embodiments, the vehicle seat adjustment system 100 may be able to determine one or more characteristics of an object on the seat, such as, for example, the dimensions of the object (height, width, diameter, or the like) based on a proximity signal outputted by the proximity sensor. The characteristic information may be used to determine whether a person is seated on a seat, and/or the height of the person in the seat. The determined information may be displayed on the screen 108. In some embodiments the vehicle seat adjustment system 100 may not include the proximity sensor.

Still referring to FIG. 1, the vehicle seat adjustment system 100 may further comprise a pressure sensor 118. The pressure sensor 118 is coupled to the communication path 104 such that the communication path 104 communicatively couples the pressure sensor 118 to other modules of the vehicle seat adjustment system 100. The pressure sensor 118 may be a force collector type sensor which measures strain due to force applied over an area. The pressure sensor 118 may be a strain sensor, a pressure transducer, a piezo-electric sensor or the like. The pressure sensor 118, similar to the proximity sensor 116, may be located at the back of a seat to detect an object pushing against the seat as shown in FIG. 2A. The pressure sensor 118 may detect a pressure applied against the pressure sensor 118 by an object behind the seat. For example, when an object (not shown in FIG. 2A) is present right behind the first row seat 210 and the first row seat 210 moves in +x direction in FIG. 2A, the pressure sensor 118 detects a pressure applied by the object. The pressure sensor 118 may be also used to detect the presence of an object in the seat. For example, the pressure sensor 118 may be located on a seatback or a seating surface of a seat to detect if an object is present in the seat. In some embodiments, the vehicle seat adjustment system 100 may not include the pressure sensor.

The vehicle seat adjustment system 100 may further comprise a speaker 120 coupled to the communication path 104 such that the communication path 104 communicatively couples the speaker 120 to other modules of the vehicle seat adjustment system 100. The speaker 120 transforms data signals from the vehicle seat adjustment system 100 into audible mechanical vibrations. The speaker 120 may provide information to an occupant of the vehicle seat adjustment system 100 about adjustment of one or more seats in the vehicle. For example, the speaker 120 may provide an alarm to the occupant when one of the seats in the vehicle is being adjusted. In another example, the speaker 120 may provide an alarm to the occupant when an object is detected in a path along which a seat is moving. In yet another example, the speaker 120 may provide an alarm to the occupant when the pressure sensor 118 detects a pressure by an object. The speaker 120 may provide different kinds of alarms depending on the type of detection.

Still referring to FIG. 1, the vehicle seat adjustment system 100 may further comprise one or more cameras 122. Each of the one or more cameras 122 is coupled to the communication path 104 and communicatively coupled to the one or more processors 102. Each of the one or more cameras 122 may be any device having an array of sensing devices capable of detecting radiation in an ultraviolet wavelength band, a visible light wavelength band, or an infrared wavelength band. In embodiments, the one or more cameras 122 may be an omni-directional camera, or a panoramic camera, for example. The one or more cameras 122 may be used to capture an image of a seat arrangement inside the vehicle to determine whether any object is present in one of the seats.

In embodiments, the one or more cameras 122 may be located in the interior of the vehicle and oriented to capture a side view of seats in the vehicle. For example, a camera may be attached to an interior of one of the doors of a vehicle to capture a side view of seats. In another example, a camera may be attached to an interior of one of the passenger windows of a vehicle to capture a side view of seats. In yet another example, a camera may be attached to an interior of a side wall of the vehicle to capture a side view of seats. In yet another example, a camera may be attached to an interior roof of the vehicle and a mirror may be attached to one of the passenger windows or one of the doors such that the camera can capture a side view of seats through the mirror. Each of the one or more cameras 122 may include a processor for processing the captured image. For example, the processor of the camera 122 may process the captured image to distinguish the body of the vehicle from external objects such as human, pets, and other objects that are not integrated to the vehicle. In another example, the camera 122 may send the captured image to the one or more processors 102, and the one or more processors 102 may process the received image to distinguish the body of the vehicle from external objects. In some embodiments, more than one camera may capture images of a seat arrangement inside the vehicle respectively and send the images to the one or more processors 102, which then process the images to create an integrated image, for example, a two-dimensional or three-dimensional image of the seat arrangement.

Still referring to FIG. 1, the vehicle seat adjustment system 100 may further comprise one or more actuators 124. Each of the one or more actuators 124 is coupled to the communication path 104 and communicatively coupled to the one or more processors 102. The one or more actuators 124 may be electric motors for moving seats in the vehicle in the longitudinal, lateral or vertical direction. In some embodiments, at least one of the one or more actuators may be operated to change the angular orientation of the seatback of a seat with respect to the seating surface of the seat in the vehicle.

Each of the one or more actuators 124 may correspond to one of seats in a vehicle and may be operated to move the corresponding seat. For example, as shown in FIG. 2A, a first actuator 124 corresponds to a first row seat 210, a second actuator 124 corresponds to a second row seat 220, and a third actuator 124 corresponds to a third row seat 230. The first actuator 124 may be operated to move the first row seat 210, the second actuator 124 may be operated to move the second row seat 220, and the third actuator 124 may be operated to move the third row seat 230.

Still referring to FIG. 1, in embodiments, the vehicle seat adjustment system 100 can be formed from a plurality of modular units, i.e., the screen 108, the tactile input hardware 110, the peripheral tactile input 112, one or more cameras 122 and one or more actuators 124, can be formed as modules communicatively coupled to one another to form the vehicle seat adjustment system 100. Accordingly, in some embodiments, each of the modules can include at least one of the one or more processors 102 and/or the one or more memory modules 106. It is noted that, while specific modules may be described herein as including a processor 102 and/or a memory module 106, the embodiments described herein can be implemented with the processors 102 and memory modules 106 distributed throughout various communicatively coupled modules.

FIG. 2A schematically depicts a seat arrangement inside a vehicle according to one or more of embodiments shown and described herein. In embodiments, the vehicle 200 may include three rows of seats including a first row seat 210, a second row seat 220, and a third row seat 230. The first row seat 210, the second row seat 220, and the third row seat 230 in FIG. 2A may be located in their default positions which are stored in the one or more memory modules 106. In other example, the first row seat 210, the second row seat 220, and the third row seat 230 in FIG. 2A may be located in their customized positions set by a user which are stored in the one or more memory modules 106. In the embodiment depicted in FIG. 2A, the driver 250 is seated in the first row seat 210. Each of the first row seat 210, the second row seat 220, and the third row seat may be moved by the first actuator 124, the second actuator 124, and the third actuator 124 respectively in the longitudinal, lateral, or vertical direction.

In embodiments, the first row seat 210 may include the peripheral tactile input 112 to receive an input from the driver 250. For example, if the driver 250 wants to adjust the position of the first row seat 210, she can activate the peripheral tactile input 112. The peripheral tactile input 112 may also be provided at any of the other seat locations for operation by one or more passengers. The peripheral tactile input 112 may include several buttons. For example, the peripheral tactile input 112 may include at least one of a button for moving the first row seat 210 in a longitudinal direction, and a button for reclining the first row seat 210. In some embodiments, the peripheral tactile input 112 may include a joystick which allows a user to move a seat in a direction corresponding to an orientation of the joystick operated by the user. In another embodiment, the peripheral tactile input 112 may be a touch screen including a seat adjustment interface which allows a user to adjust the position of a selected seat.

Figure 2B:
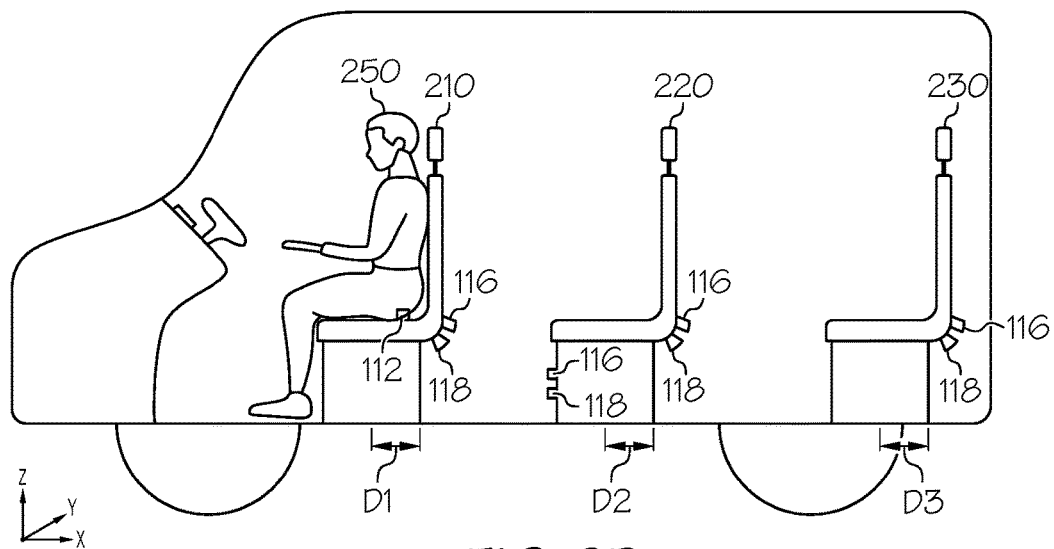
FIG. 2B schematically depicts a side view of a seat arrangement inside a vehicle according to one or more embodiments shown and described herein.

The input to the peripheral tactile input 112 for moving the first row seat 210 may be transmitted to the one or more processors 102. Then, the one or more processors 102 may transmit instructions to the first actuator 124, the second actuator 124, and the third actuator 124 to move the first row seat 210, the second row seat 220, and the third row seat 230 respectively in the same direction, for example, +x direction. Then, the first actuator 124, the second actuator 124, and the third actuator 124 may move the first row seat 210, the second row seat 220, and the third row seat 230 based on the instructions. For example, the first actuator 124 may move the first row seat 210 by a distance D1 in +x direction, the second actuator 124 may move the second row seat 220 by a distance D2 in +x direction, and the third actuator 124 may move the third row seat 230 by a distance D3 in +x direction as illustrated in FIG. 2B. In embodiments, the first, second, and third actuators 124 may move the first row seat 210, the second row seat 220, and the third row seat 230 simultaneously.

In embodiments, all the distances D1, D2, and D3 may be substantially the same such that the space between the first row seat 210 and the second row seat 220 and the space between the second row seat 220 and the third row seat 230 are maintained. The operations of the first actuator 124, the second actuator 124, and the third actuator 124 may be synchronized by the one or more processors 102, and thus, the first row seat 210, the second row seat 220, and the third row seat 230 may be moved by the actuators 124 simultaneously. In this regard, the space between the first row seat 210 and the second row seat 220 and the space between the second row seat 220 and the third row seat 230 may not change while the seats 210, 220, and 230 are moving. Because the space between seats does not change even when the seats are moving, an occupant or any other object in the seats may not be encroached upon between the seats. In another embodiment, the distances D1, D2, and D3 may be different values. For example, the distance D2 and the distance D3 may be shorter than the distance D1. The distance D2 may be 50% of the distance D1, and the distance D3 may be 50% of the distance D1.

In some embodiments, time difference may exist between the movement of the first row seat 210 and the movement of the second row seat 220 and the third row seat 230. For example, in response to the input to the peripheral tactile input 112, the first row seat 210 may be moved in +x direction by the first actuator 124 after the second row seat 220 and the third row seat 230 may be moved in +x direction by the second actuator 124 and the third actuator. In other example, in response to the input to the peripheral tactile input 112, the first row seat 210 may be moved in +x direction by the first actuator 124 before the second row seat 220 and the third row seat 230 may be moved in +x direction by the second actuator 124 and the third actuator.

Each of the first row seat 210, the second row seat 220, and the third row seat 230 may include the proximity sensor 116 and the pressure sensor 118. As shown in FIG. 2A, the proximity sensor 116 and the pressure sensor 118 may be positioned at the back of each seat. In other embodiments, the proximity sensor 116 and the pressure sensor 118 may be located at the front bottom of each seat, for example, proximate to an ankle of a passenger when seated in the seat. The proximity sensor 116 may detect an object nearby. The pressure sensor 118 may detect a force against the pressure sensor. For example, the pressure sensor 118 may detect a pressure by an object (not shown in FIG. 2A) positioned between the first row seat 210 and the second row seat 220 when the first row seat 210 moves in a longitudinal direction (+x direction) and the object touches the pressure sensor 118. Signals from the proximity sensor 116 and/or the pressure sensor 118 may be transmitted to the one or more processors 102. Then, the processors 102 may control the operation of the first, second and third actuators 124 based on the received signals. For example, the processors 102 may instruct the first, second, and third actuators 124 to limit or reduce the movement of the first row seat 210, the second row seat 220, and the third row seat 230 when the pressure sensor 118 detects a pressure, or the proximity sensor 116 detects an object within a predetermined distance.

In some embodiments, when an object is positioned between the first row seat 210 and the second row seat 220, and the first actuator 124 moves the first row seat 210 in +x direction in FIG. 2A, the electric current in the first actuator 124 increases when the first row seat 210 contacts the object. The one or more processors 102 may determine that an object is present behind the first row seat 210 based on the increase in the electric current of the first actuator 124.

Figure 3A:
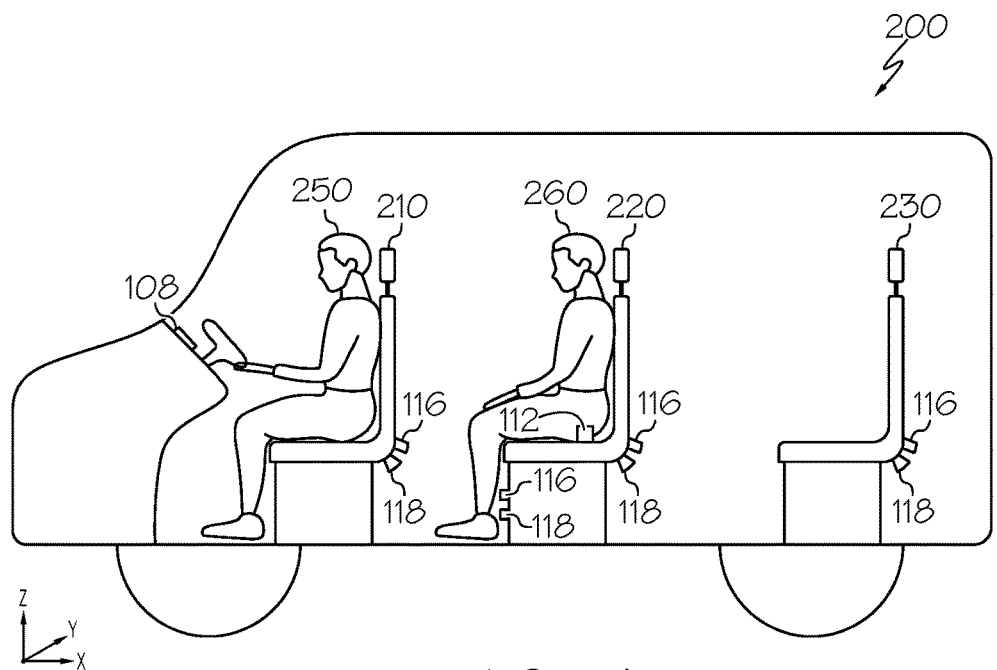
FIG. 3A schematically depicts a side view of a seat arrangement inside a vehicle according to another embodiment shown and described herein.

FIG. 3A schematically depicts a seat arrangement inside a vehicle according to another embodiment shown and described herein. In embodiments, the second row seat 220 may include the peripheral tactile input 112 to receive input from a passenger 260. For example, if the passenger 260 wants to adjust the position of the second row seat 220, she can activate the peripheral tactile input 112. The peripheral tactile input 112 may include several buttons as described above. In some embodiments, the peripheral tactile input 112 may include a joystick which allows a user to move a seat in a direction corresponding to an orientation of the joystick operated by the user. In other embodiments, the peripheral tactile input 112 may be a touch screen including a seat adjustment interface which allows a user to adjust the position of a selected seat.

Figure 3B:
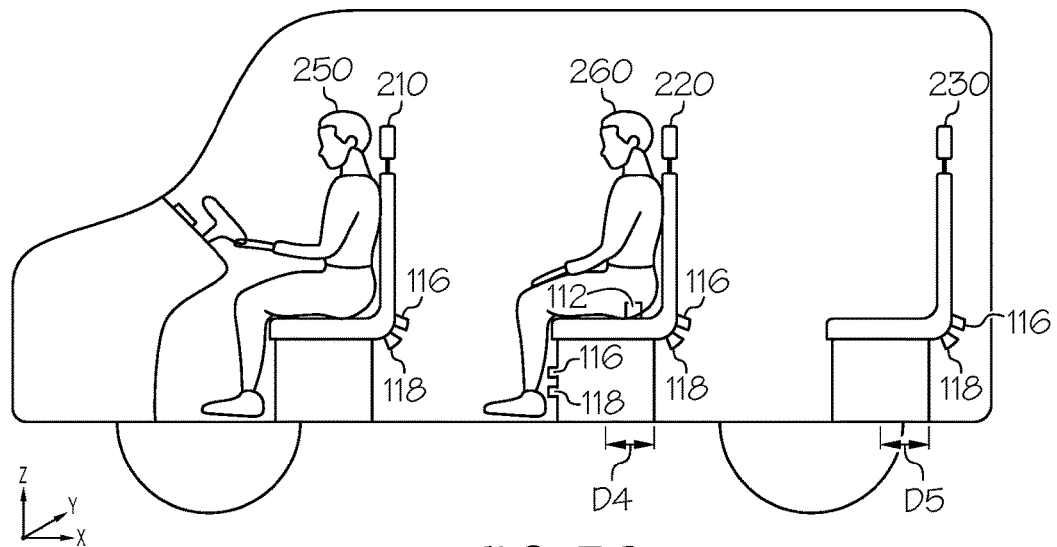
FIG. 3B schematically depicts a side view of a seat arrangement inside a vehicle according to another embodiment shown and described herein.

The input to the peripheral tactile input 112 for moving the second row seat 220 may be transmitted to the one or more processors 102. Then, the one or more processors 102 may transmit instructions to the second actuator 124 and the third actuator 124 to move the second row seat 220, and the third row seat 230 respectively in the same direction, for example, +x direction. Then, the second actuator 124 and the third actuator 124 may move the second row seat 220 and the third row seat 230 based on the instructions. For example, the second actuator 124 may move the second row seat 220 by a distance D4 in +x direction, and the third actuator 124 may move the third row seat 230 by a distance D5 in +x direction as shown in FIG. 3B. The distances D4 and D5 may be the same distance, or the different distances. For example, the distance D5 may be 50% of the distance D4. In this embodiment, only the second row seat 220 and the third row seat 230 may be moved and the first row seat 210 may maintain its position because the driver 250 is seated in the first row seat 210 and moving the first row seat 210 may interfere with the driving. The presence of the driver 250 may be detected by the proximity sensor 116 or the pressure sensor 118. In another embodiment, if it is determined no object is present in the first row seat 210, the one or more processors 102 may transmit instructions to the first actuator 124, the second actuator 124, and the third actuator 124 to move the first row seat 210, the second row seat 220, and the third row seat 230 in response to the input from the passenger 260.

Figure 4A:
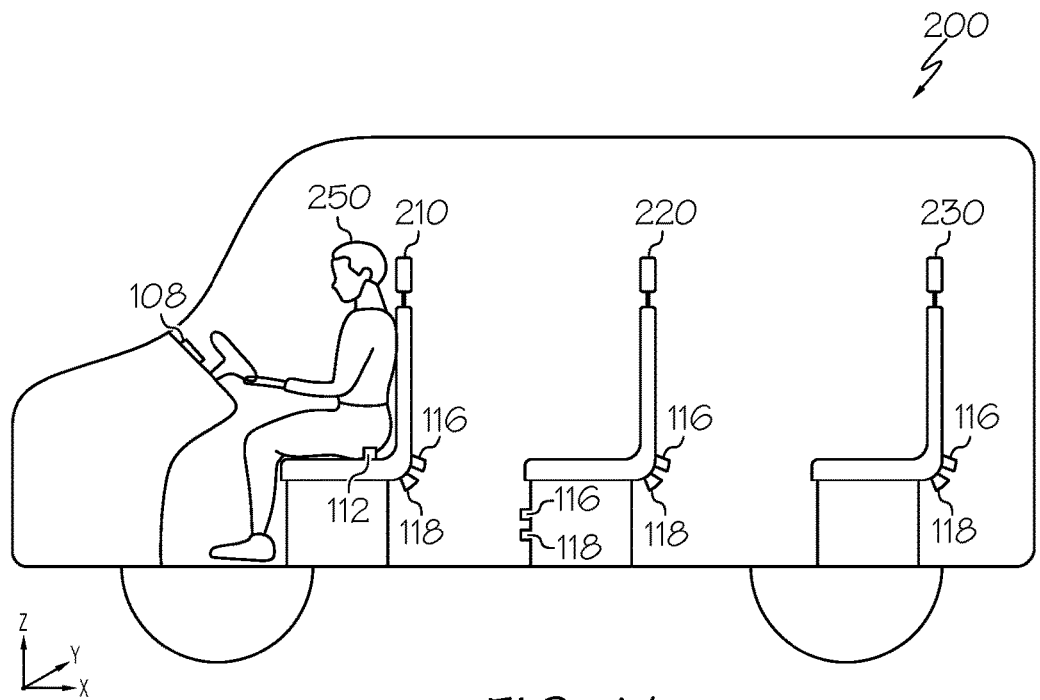
FIG. 4A schematically depicts a side view of a seat arrangement inside a vehicle according to another embodiment shown and described herein.

FIG. 4A schematically depicts a seat arrangement inside a vehicle according to one or more of embodiments shown and described herein. In embodiments, the first row seat 210 may include the peripheral tactile input 112 to receive input from the driver 250. For example, if the driver 250 wants to change an angular orientation of a seatback of the first row seat 210 (i.e., reclining), she can activate the peripheral tactile input 112.

Figure 4B:
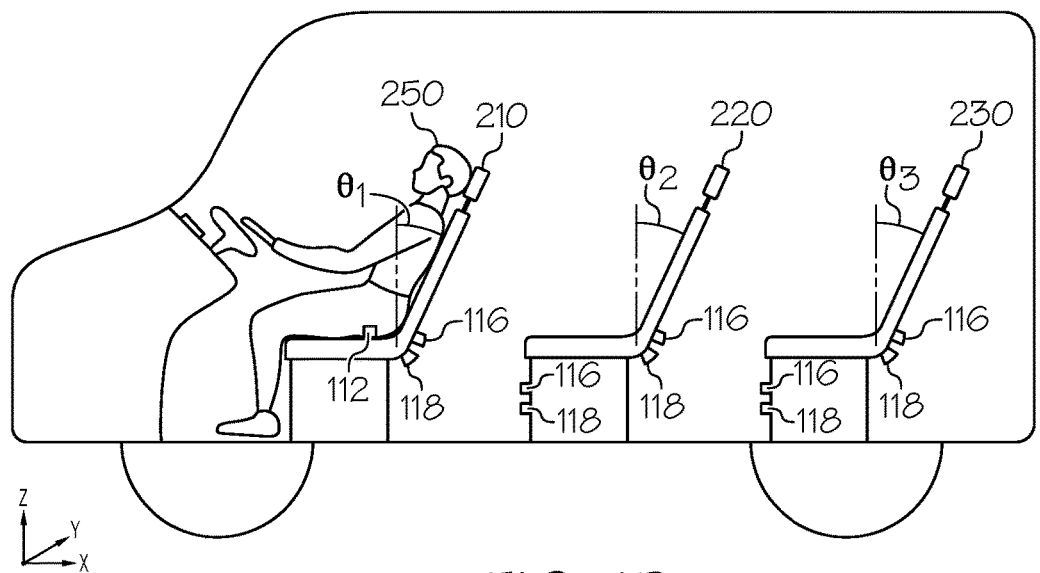
FIG. 4B schematically depicts a side view of a seat arrangement inside a vehicle according to another embodiment shown and described herein.

The input to the peripheral tactile input 112 for changing the angular orientation of the seatback of the first row seat 210 may be transmitted to the one or more processors 102. Then, the one or more processors 102 may transmit instructions to the first actuator 124, the second actuator 124, and the third actuator 124 to recline the first row seat 210, the second row seat 220, and the third row seat 230 respectively in the same direction, for example, clockwise. Then, the first actuator 124, the second actuator 124, and the third actuator 124 may recline the first row seat 210, the second row seat 220, and the third row seat 230 clockwise as shown in FIG. 4B. For example, the first actuator 124 may recline the first row seat 210 by an angle θ1, the second actuator 124 may recline the second row seat 220 by an angle θ2, and the third actuator 124 may recline the third row seat 230 by an angle θ3 as shown in FIG. 4B. All the angle θ1, the angle θ2, and the angle θ3 may be substantially the same. In some embodiments, the angle θ1, the angle θ2, and the angle θ3 may be different values. For example, the angle θ1 may be 20 degrees, and the angel θ2 and the angle θ3 may be 10 degrees. In other example, the angle θ1 may be 20 degrees, and the angel θ2 and the angle θ3 may be 30 degrees.

Figure 5A:
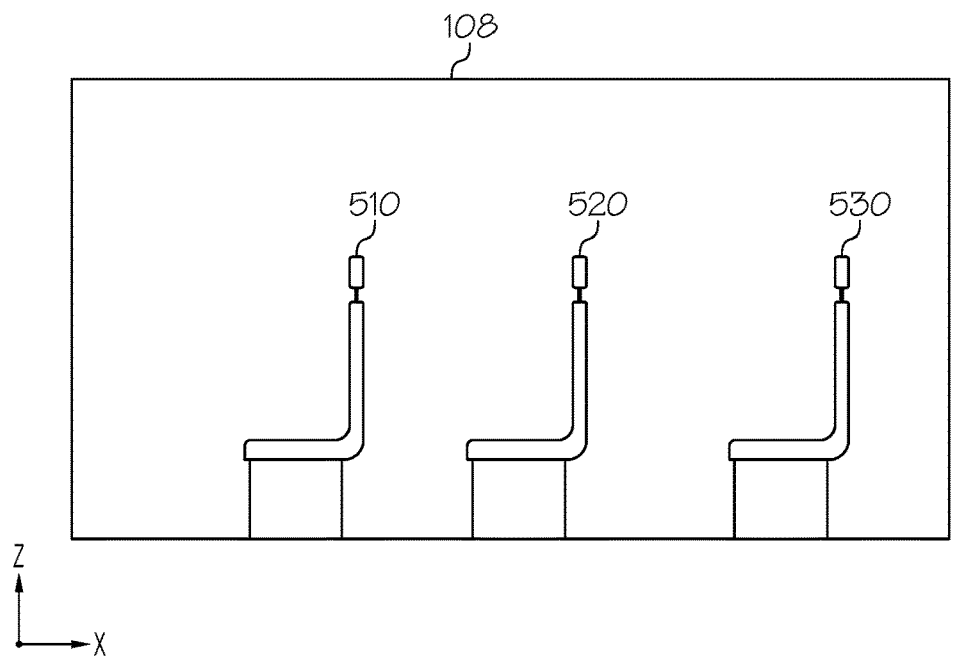
FIG. 5A depicts a vehicle screen showing a schematic seat arrangement image according to one or more embodiments shown and described herein.
Figure 5B:
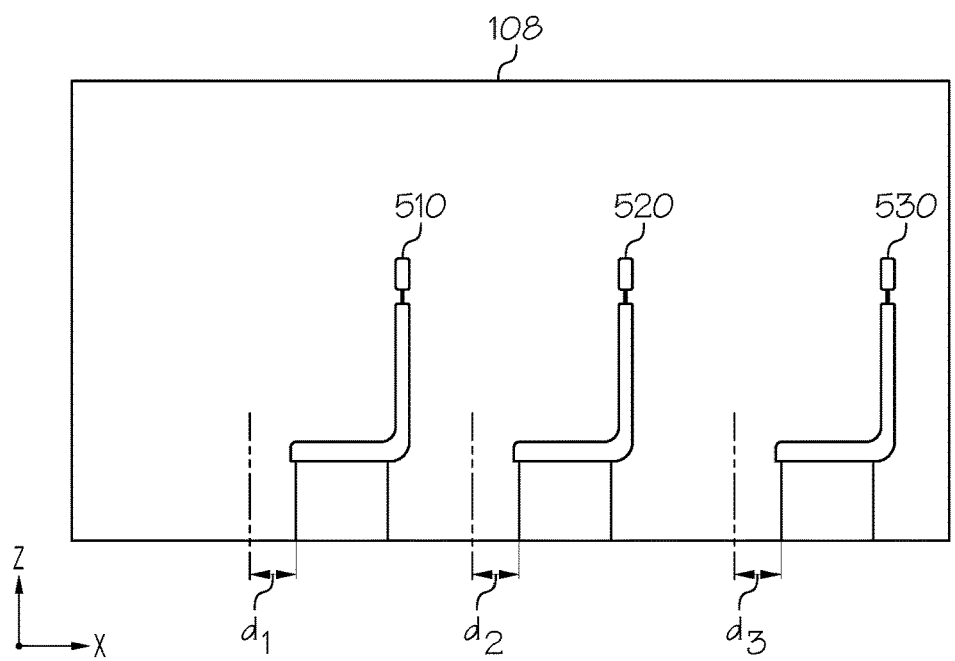
FIG. 5B depicts a vehicle screen showing a schematic seat arrangement image according to one or more embodiments shown and described herein.

FIGS. 5A and 5B depict the screen 108 showing a seat arrangement according to one or more embodiments shown and described herein. The seat arrangement may show positions of seats within a vehicle. FIG. 5A depicts default positions of the first row seat 510, the second row seat 520, and the third row seat 530. The default positions information may be stored in the one or more memory modules 106, and the one or more processors 102 may generate an image of the seat arrangement for the first row seat 510, the second row seat 520, and the third row seat 530 based on the default positions information. In other example, the first row seat 510, the second row seat 520, and the third row seat 530 may be located in customized positions set by a user, and the one or more processors 102 may generate an image of the seat arrangement for the first row seat 510, the second row seat 520, and the third row seat 530 based on information about the customized positions which may be stored in the one or more memory modules 106.

Once the positions of at least one of the first row seat 510, the second row seat 520, and the third row seat 530 are changed by at least one of the first actuator 124, the second actuator 124, and the third actuator 124, the one or more processors 102 may calculate the displacement of each of the first row seat 510, the second row seat 520, and the third row seat 530, and generate an image of the changed seat arrangement based on the displacement as shown in FIG. 5B. In FIG. 5B, an image of the first row seat 510 is displaced by a distance $d_1$ in +x direction, the second row seat 520 is displaced by a distance $d_2$ in +x direction, and the third row seat 530 is displaced by a distance $d_3$ in +x direction, compared to the image of FIG. 5A. For example, the displacement may be calculated based on the operation amount of the first actuator 124, the second actuator 124, and the third actuator 124. In other example, the displacement may be calculated based images captured by the camera 122. In another example, the displacement may be calculated based on signals from the proximity sensors 116. The image of the changed seat arrangement may be displayed on the screen 108 as shown in FIG. 5B. In this regard, an occupant of the vehicle may understand current relative positions of seats within a vehicle by looking at the screen 108. In another embodiment, an actual image captured by the one or more cameras 122 may be displayed on the screen 108.

Figure 6:
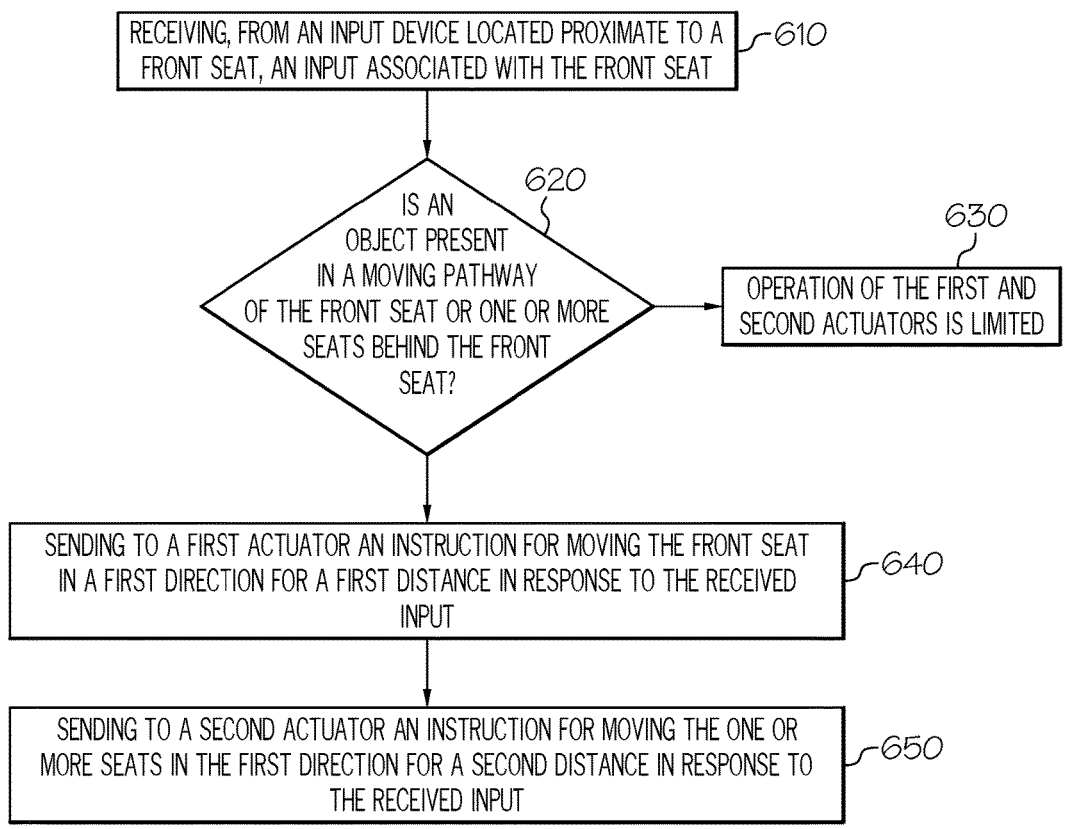
FIG. 6 is a flowchart of one method for adjusting seats in a vehicle in accordance with one or more embodiments shown and described herein.

FIG. 6 depicts a schematic flowchart representing a method for adjusting seats in a vehicle in accordance with one or more embodiments shown and described herein.

In step 610, the vehicle seat adjustment system 100 receives an input for moving a front seat. In embodiments, the one or more processors 102 of the vehicle seat adjustment system 100 receive a signal from the peripheral tactile input 112 in response to the press of the peripheral tactile input 112 by an occupant of the vehicle. In one embodiment, the signal from the peripheral tactile input 112 may be a signal for moving the front seat. In another embodiment, the signal from the peripheral tactile input 112 may be a signal for changing an angular orientation of a seatback of the front seat.

In step 620, the vehicle seat adjustment system 100 determines whether an object is present in a moving pathway of the front seat, or one or more seats behind the front seat. As described above, the object may be detected in various ways, for example by a processed image, the proximity sensor 116, the pressure sensor 118, etc. If it is determined that an object is present in the pathway, the one or more processors 102 may limit the operation of the actuator 124 in step 630. For example, the one or more processors 102 may disable the moving operation of the first actuator 124.

If it is determined that an object is not present in the pathway, in step 640, the vehicle seat adjustment system 100 sends to the first actuator 124 an instruction for moving the front seat in a first direction for a first distance in response to the received input. For example, the instruction may be an instruction for moving the front row seat in +x direction by the distance D1.

In step 650, the vehicle seat adjustment system 100 sends to the second actuator 124 an instruction for moving the one or more seats in the first direction for a second distance in response to the received input. For example, the instruction may be an instruction for the second actuator to move the one or more seats in +x direction by distance D2. The step 640 and the step 650 may be implemented simultaneously. For example, the one or more processors 102 send instructions to the first actuator 124 and the second actuator 124 at the same time.

Although not shown in FIG. 6, the one or more processors 102 may optionally disable movement by the actuators 124 under certain driving conditions. For example, when the transmission of the vehicle is in a driving mode, or the vehicle is driving at a speed greater than a certain threshold value, the one or more processors 102 may disable movement by the actuators 124. That is, the one or more processors 102 may enable the movement by the actuators 124 only when the transmission of the vehicle is in park or the vehicle is traveling at a speed below the certain threshold value.

It should be understood that embodiments described herein are directed to a vehicle seat adjustment system includes a front seat of a vehicle, one or more seats behind the front seat, an input device configured to receive an input for adjusting the position of the front seat, a first actuator configured to adjust positions of the front seat, a second actuator configured to adjust positions of the one or more seats, and a controller communicatively coupled to the input device and the first and second actuators. The controller instructs the first actuator to move the front seat in a longitudinal direction for a first distance in response to the received input, and instructs the second actuator to move the one or more seats in the longitudinal direction for a second distance in response to the received input. In this regard, the present vehicle seat adjustment systems move more than one seat in a linked manner. This allows maintaining the space between seats in a vehicle, and may not require further manual operations by an occupant to adjust space between the seats.

It is noted that the terms "substantially" and "proximate" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle seat adjustment system for a vehicle, comprising:
   a front seat of the vehicle;
   one or more passenger seats behind the front seat;
   an input device configured to receive an input from a user for adjusting positions of the front seat;
   a first actuator configured to adjust positions of the front seat;
   a second actuator configured to adjust positions of the one or more passenger seats;
   a controller communicatively coupled to the input device, the first actuator, and the second actuator, the controller comprising at least one processor and at least one memory storing computer readable and executable instructions that, when executed by the at least one processor, causes the controller to:
   receive the input from the input device;
   instruct the first actuator to move the front seat in a longitudinal direction for a first distance in response to the received input; and
   instruct the second actuator to move the one or more passenger seats in the longitudinal direction for a second distance in response to the received input,
   wherein the first actuator moves the front seat in the longitudinal direction for the first distance before or after the second actuator moves the one or more passenger seats in the longitudinal direction for the second distance in response to the received input.

2. The vehicle seat adjustment system of claim 1, wherein the first distance is the same as the second distance.

3. The vehicle seat adjustment system of claim 1, wherein the second distance is less than the first distance.

4. The vehicle seat adjustment system of claim 3, wherein the second distance is 50 percentage of the first distance.

5. The vehicle seat adjustment system of claim 1, further comprising:
   a third actuator configured to change an angular orientation of a seatback of the front seat with respect to a seating surface of the front seat; and
   a fourth actuator configured to change an angular orientation of a seatback of the one or more passenger seats with respect to a seating surface of the one or more passenger seats, and
   wherein the computer readable and executable instructions, when executed by the at least one processor, cause the controller to instruct the third actuator to change the angular orientation of the seatback of the front seat in response to the received input, and instruct the fourth actuator to change the angular orientation of the seatback of the one or more passenger seats in response to the received input.

6. The vehicle seat adjustment system of claim 1, further comprising
   a screen displaying positions of the front seat and the one or more passenger seats within the vehicle.

7. The vehicle seat adjustment system of claim 1, further comprising one or more sensors communicatively coupled to the controller and configured to provide a signal indicative of presence of an object on the one or more passenger seats to the controller,
   wherein the computer readable and executable instructions, when executed by the at least one processor, cause the controller to receive the signal indicative of the presence of the object from the one or more sensors.

8. The vehicle seat adjustment system of claim 7, wherein the computer readable and executable instructions, when executed by the at least one processor, cause the controller to disable at least one of the first actuator and the second actuator in response to a signal from the one or more sensors indicating the presence of the object on the one or more passenger seats.

9. The vehicle seat adjustment system of claim 7, wherein the computer readable and executable instructions, when executed by the at least one processor, cause the controller to limit the movement of at least one of the first actuator and the second actuator in response to a signal from the one or more sensors indicating the presence of the object on the one or more passenger seats.

10. The vehicle seat adjustment system of claim 7, further comprising a speaker configured to provide an alarm in response to a signal from the one or more sensors indicating the presence of the object on the one or more passenger seats.

11. The vehicle seat adjustment system of claim 10, further comprising:
    a fifth actuator communicatively coupled to the input device and configured to adjust positions of a third row of seats; and
    a second input device configured to receive an input from a user for adjusting positions of the second row of seats,
    wherein the second input device is located on one of the second row of seats, and
    the computer readable and executable instructions, when executed by the at least one processor, cause the controller to instruct the second actuator and the third actuator to move the second row of seats and the third row of seats simultaneously in response to the input received by the second input device.

12. The vehicle seat adjustment system of claim 1, wherein the one or more passenger seats comprise a second row of seats behind the front seat and a third row of seats behind the second row of seats.

13. The vehicle seat adjustment system of claim 1, wherein the input device is located on the front seat.

14. A method of adjusting positions of a front seat and one or more passenger seats located behind the front seat in a vehicle, the method comprising:
- receiving an input associated with the front seat from an input device of the vehicle;
- sending to a first actuator of the vehicle an instruction for moving the front seat in a first direction for a first distance in response to the received input; and
- sending to a second actuator of the vehicle an instruction for moving the one or more passenger seats in the first direction for a second distance in response to the received input
- wherein the first actuator moves the front seat in the first direction for a first distance before or after the second actuator moves the one or more passenger seats in the first direction for the second distance in response to the received input.

15. The method of claim 14, further comprising:
- detecting an object in a moving pathway of the front seat or the one or more passenger seats; and
- disabling movement operations by the first actuator and the second actuator in response to the detection of the object.

16. The method of claim 14, further comprising
- disabling the first actuator and the second actuator when the vehicle is traveling at a speed greater than a predetermined value.

* * * * *